(12) United States Patent
Ohrtman, Jr. et al.

(10) Patent No.: US 11,186,924 B2
(45) Date of Patent: Nov. 30, 2021

(54) MACHINE AND PROCESS FOR DECORTICATING PLANT MATTER

(71) Applicants: Franklin D Ohrtman, Jr., Denver, CO (US); Konrad F Ohrtman, Denver, CO (US)

(72) Inventors: Franklin D Ohrtman, Jr., Denver, CO (US); Konrad F Ohrtman, Denver, CO (US)

( * ) Notice: Subject to any disclaimer, the term of this patent is extended or adjusted under 35 U.S.C. 154(b) by 0 days.

(21) Appl. No.: 17/018,534

(22) Filed: Sep. 11, 2020

(65) Prior Publication Data

US 2020/0407877 A1 Dec. 31, 2020

Related U.S. Application Data

(63) Continuation-in-part of application No. 16/387,838, filed on Apr. 18, 2019, now Pat. No. 10,837,125.

(60) Provisional application No. 62/659,484, filed on Apr. 18, 2018.

(51) Int. Cl.
| | |
|---|---|
| *D01B 1/22* | (2006.01) |
| *F16H 1/20* | (2006.01) |
| *D01B 1/44* | (2006.01) |
| *D01B 1/46* | (2006.01) |
| *D01B 5/00* | (2006.01) |
| *D01B 1/24* | (2006.01) |

(52) U.S. Cl.
CPC .............. *D01B 1/22* (2013.01); *D01B 1/24* (2013.01); *D01B 1/44* (2013.01); *D01B 1/46* (2013.01); *D01B 5/00* (2013.01); *F16H 1/203* (2013.01); *F16H 1/206* (2013.01)

(58) Field of Classification Search
CPC ... D01B 1/22; D01B 1/24; D01B 1/44; D01B 1/46; D01B 5/00; F16H 1/203; F16H 1/206
See application file for complete search history.

(56) References Cited

U.S. PATENT DOCUMENTS

| | | | | |
|---|---|---|---|---|
| 420,575 | A * | 2/1890 | Hartshorn | D01B 1/22 19/30 |
| 1,308,376 | A * | 7/1919 | Schlichten | D01B 1/22 19/24 |
| 1,447,450 | A * | 3/1923 | Wessel | D01B 1/22 19/29 |
| 1,709,001 | A * | 4/1929 | Booth | D01B 1/22 19/31 |
| 1,722,110 | A * | 7/1929 | Pritchard | D01B 1/22 19/24 |
| 1,807,221 | A * | 5/1931 | Mccaw | D01B 1/22 19/29 |
| 1,855,941 | A * | 4/1932 | Cookson | D01B 1/22 19/28 |
| 2,215,050 | A * | 9/1940 | Nicholas | D01B 1/22 19/12 |

(Continued)

*Primary Examiner* — Shaun R Hurley
(74) *Attorney, Agent, or Firm* — Leyendecker & Lemire, LLC

(57) ABSTRACT

A decorticating machine comprising modular drum assemblies of different tooth and surface patterns that are installed between pairs of left and right lower and upper rails is described. The modular drum assemblies (usually provided in upper and lower drum pairs) and the number thereof can be chosen based on the particulars of the type of stalk being processed.

20 Claims, 9 Drawing Sheets

(56) References Cited

U.S. PATENT DOCUMENTS

| | | | | |
|---|---|---|---|---|
| 2,264,236 A * | 11/1941 | Bokum | D01B 1/22 |
| | | | 19/24 |
| 2,356,000 A * | 8/1944 | Patterson | D01B 1/22 |
| | | | 19/31 |
| 2,480,602 A * | 8/1949 | Patterson | D01B 1/22 |
| | | | 19/30 |
| 2,496,570 A * | 2/1950 | Trumbo | D01B 1/22 |
| | | | 19/19 |
| 2,576,406 A * | 11/1951 | Mccrae | D01B 1/14 |
| | | | 19/12 |
| 2,719,332 A * | 10/1955 | Short | D01B 1/14 |
| | | | 19/24 |
| 2,835,928 A * | 5/1958 | Johnson | D01B 1/22 |
| | | | 19/31 |
| 5,465,464 A * | 11/1995 | Chen | D01B 1/22 |
| | | | 19/24 |
| 5,720,083 A * | 2/1998 | Leduc | D01B 1/16 |
| | | | 19/24 |
| 5,906,030 A * | 5/1999 | Leduc | D01B 1/16 |
| | | | 19/24 |
| 9,080,257 B2 * | 7/2015 | Lupien | D01B 1/28 |
| 9,957,642 B2 * | 5/2018 | Dyas | D01B 1/30 |
| 10,837,125 B2 * | 11/2020 | Ohrtman, Jr. | D01B 1/22 |
| 2007/0044890 A1 * | 3/2007 | Sherwood | A01D 82/02 |
| | | | 156/62.2 |
| 2013/0281578 A1 * | 10/2013 | Jiang | A01F 7/02 |
| | | | 524/9 |

* cited by examiner

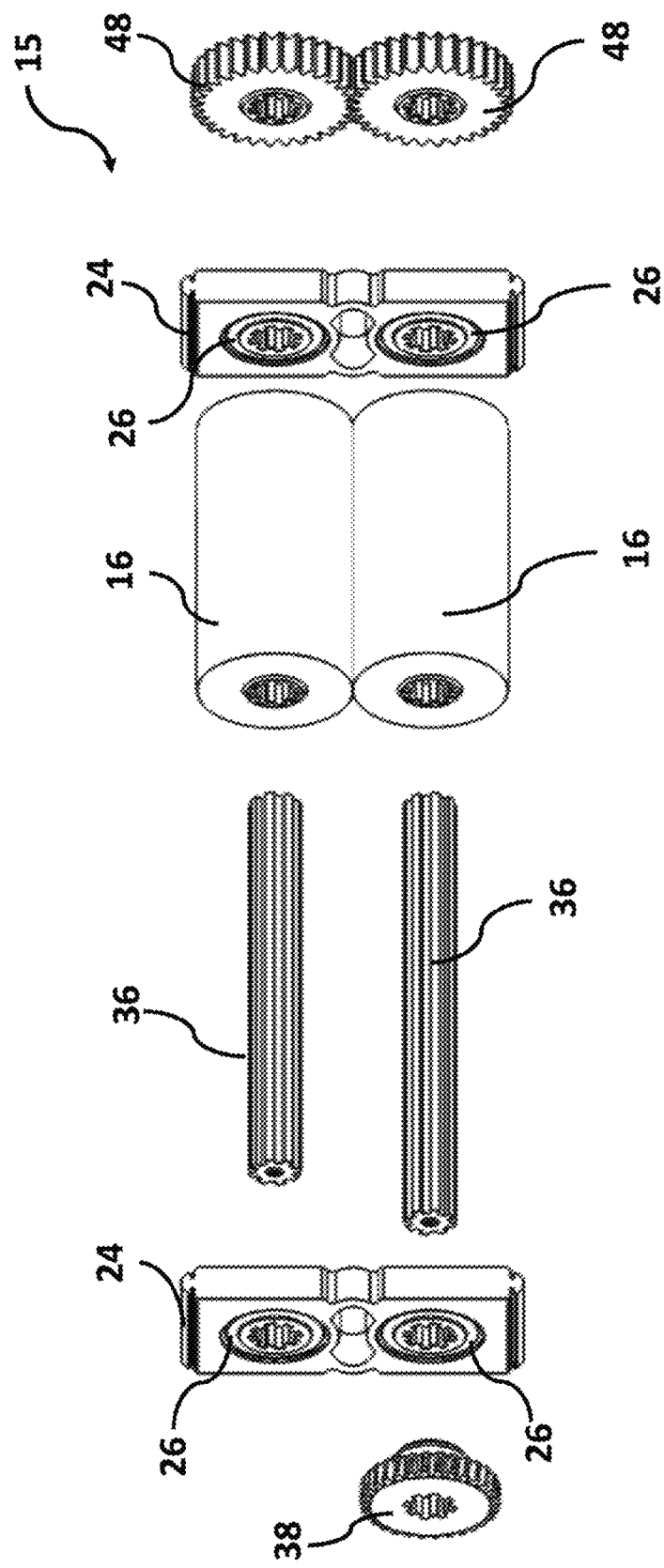

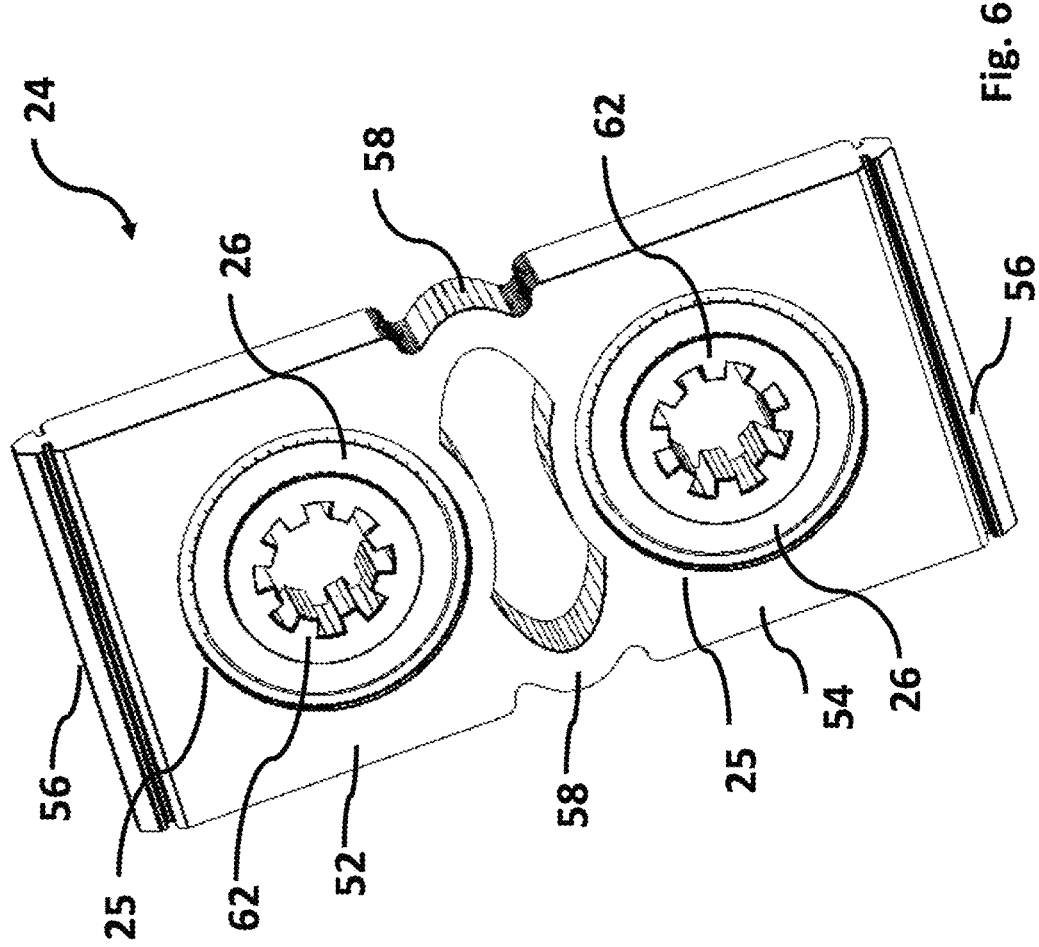

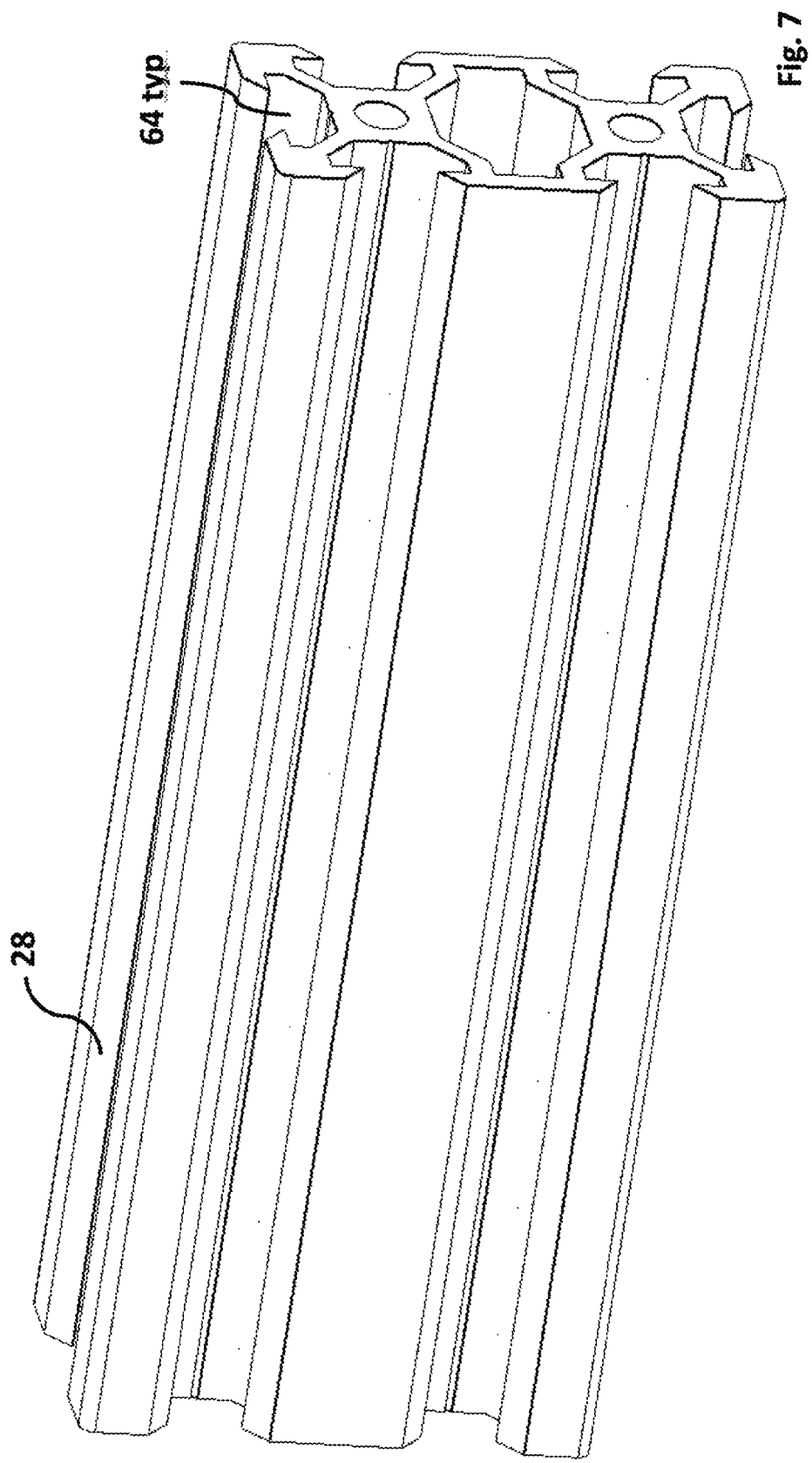

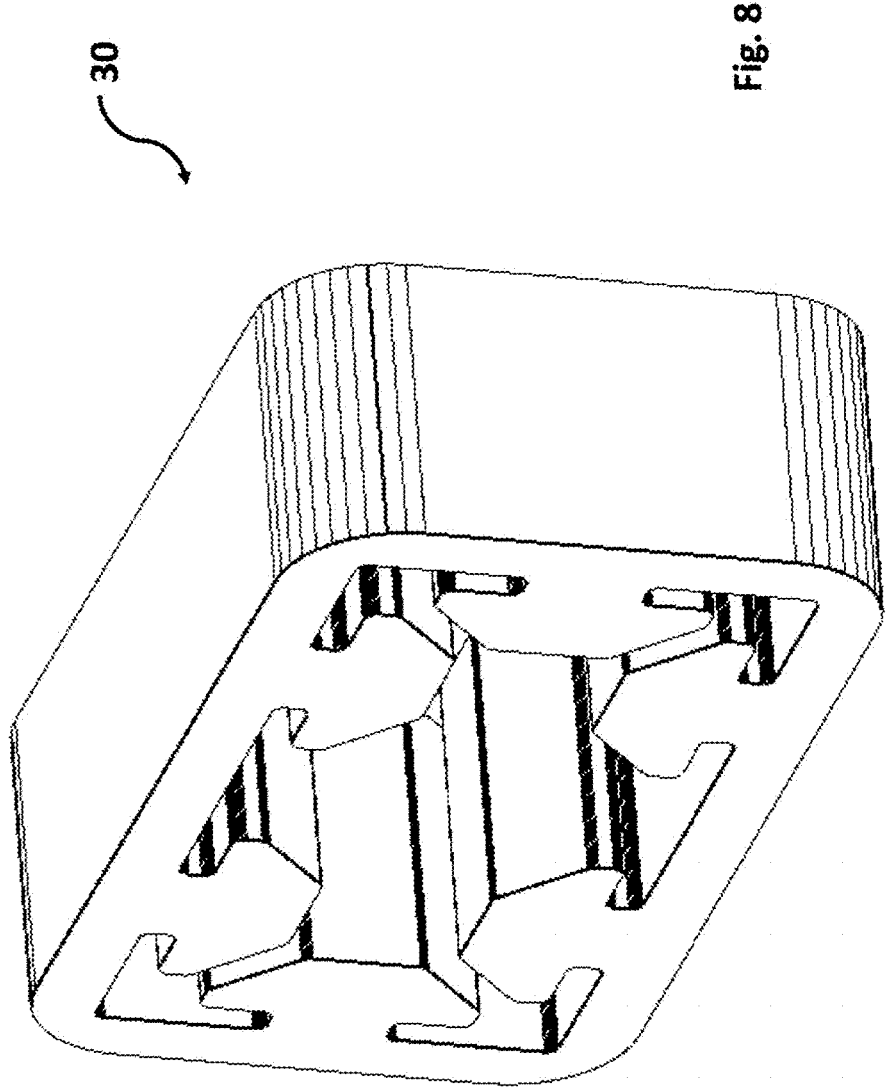

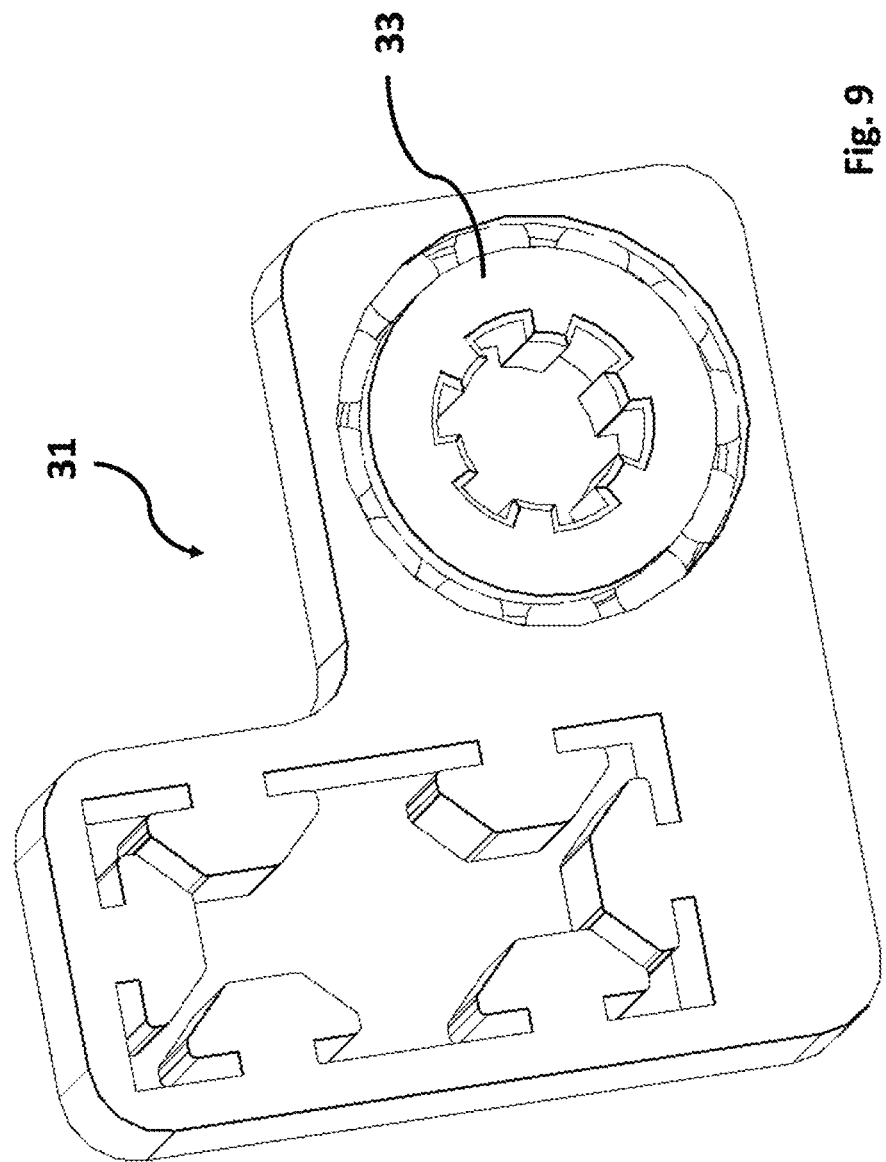

MACHINE AND PROCESS FOR DECORTICATING PLANT MATTER

RELATED APPLICATIONS

This application is a continuation in part to U.S. patent application Ser. No. 16/387,838 filed on Apr. 18, 2019, which shares the same name and at least one inventor with the present application. As applicable, the present application claims priority to and incorporates fully by reference the foregoing application, as well as, U.S. Provisional Patent Application No. 62/659,484 filed on Apr. 18, 2018 also sharing the same title and at least one inventor.

BACKGROUND

The stalks of the Hemp plant and other plants contain bast fibers that when removed from the plants can be used to produce textiles and other industrial and consumer goods. Within recent years federal laws have changed making the cultivation of the hemp plant legal.

However, to make use of the desirable bast fibers, they must be removed from the remainder of the stalk, and more particularly, the stalk's hurd. Unfortunately, prior art machinery to accomplish this task, also known as a decorticator, were designed nearly one hundred years ago and before, and accordingly, do not take advantage of modern materials, modern design, and modern manufacturing technology. Prior art machinery is very expensive and because of this as well as the machinery's size and weight, it is ill-suited to use by smaller producers.

BRIEF DESCRIPTION OF THE DRAWINGS

FIG. 5 is a exploded perspective view of a drum subassembly according to the one embodiment of the present invention.

FIG. 6 a perspective view of a bearing block according to the one embodiment of the present invention.

FIG. 7 a perspective view of a T-rail according to the one embodiment of the present invention.

FIG. 8 a perspective view of an upper Trail spacer according to the one embodiment of the present invention.

FIG. 9 a perspective view of a lower T-rail spacer according to the one embodiment of the present invention.

DETAILED DESCRIPTION

Figure 1:
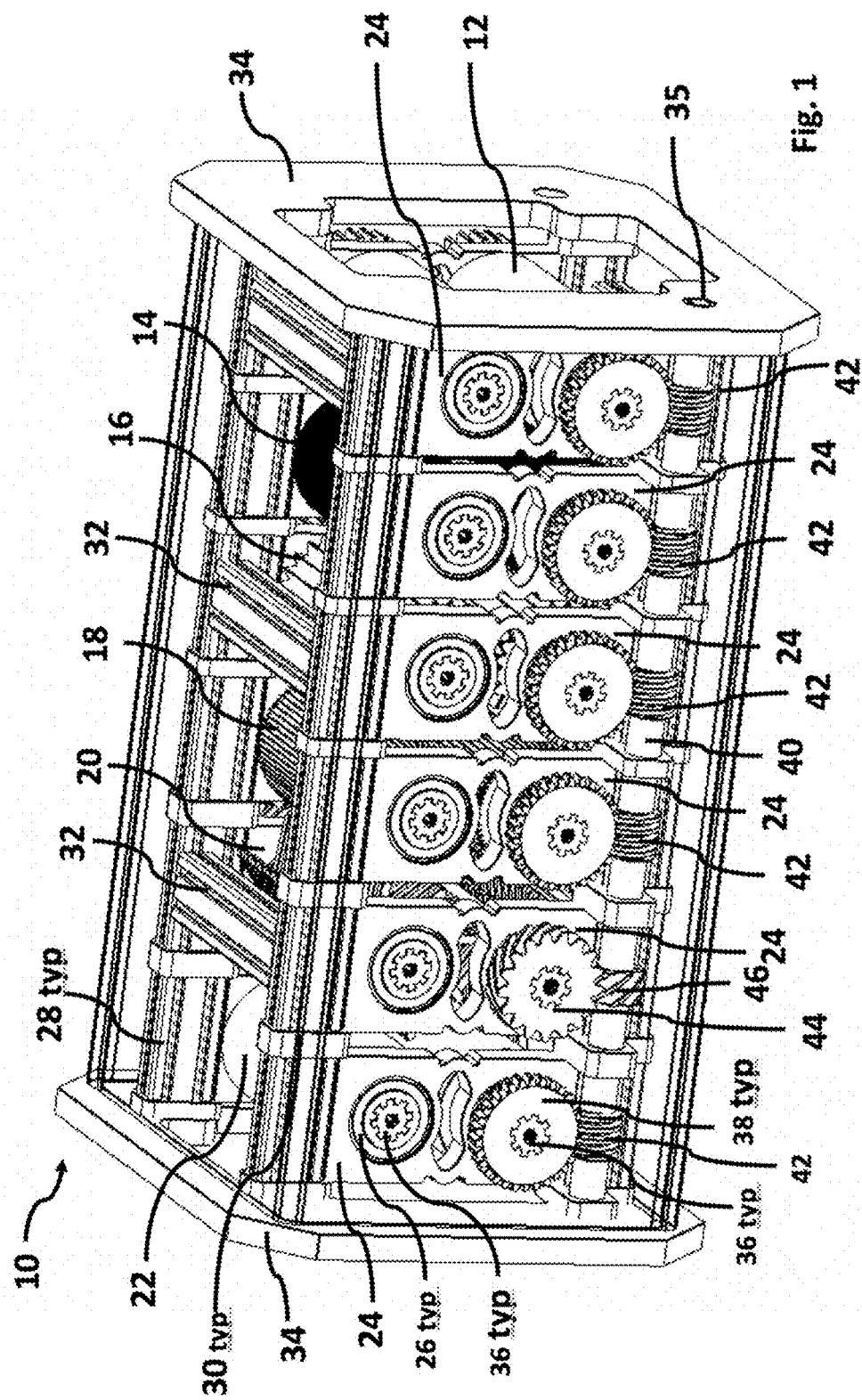
FIG. 1 is a left side perspective view of a decorticating machine according to a one embodiment of the present invention.

A modular decorticating machine (or decorticator) is described.

Embodiments of the machine comprise modular drum pair assemblies of different tooth and surface patterns that are installed in a frame comprised largely of T-rails. The modular drum pair assemblies and the number thereof can be chosen based on the particulars of the type of stalk being processed. One embodiment described herein comprises six drum pair assemblies; wherein other embodiments can utilize any number of drum pair assemblies necessary to separate the fiber from the hurd of a particular plant. Accordingly, the embodiment shown herein is not to be considered limiting.

The drum pair assemblies each typically include: (1) upper and lower drums having a specific surface tooth pattern depending on the specific operation to be performed by the pair; (2) left and right bearing shafts for each drum that are received in either side of the associated drum along the drum's longitudinal axis; (3) integrally biasing left and right bearing blocks for each drum pair; and (4) appropriate gears and/or pulleys attached to the ends of the bearing shafts to facilitate the rotational movement and operation of the drum assemblies and the machine.

The longitudinal T-rails of the frame typically comprise elongated metal (typically extruded aluminum) members that are generally rectangular or square in overall cross section but typically include one or more dovetail slots or T-slots that extend longitudinally along each side. In some variations, all four sides include slots while in other just two opposing sides have slots. The T-rails are often referred to as T-slotted framing rails or T-slot rails in the art. The length of the rails can vary depending on the number of drum assemblies that are going to be attached to the rails. The bearing blocks include upper and lower dovetail protrusions that are received in the T-slots as is described below.

The bearing blocks are typically fabricated as single piece, such as by molding or 3D printing to create a unitary block. Each block comprises upper and lower sections with each including a bore into which a bearing race is secured. The shaft of an upper drum is received in an upper race of the upper section and the shaft of the lower drum is received in a lower race of the lower section. The upper and lower sections are connected by a pair of curved integrally molded leaves that bias the attached upper and lower drum against each other but permit a some amount of flex as is necessary when feeding stalks through the associated drum pair. Advantageously, these integrally molded leaves replace the need for separate spring members.

In addition to the rails and drum pair assemblies, gears and a drive shaft are typically provided to facilitate the rotational and operational movement of the various components when coupled to a motor. In yet other embodiments of the decorticator, one of the drums may further include a hub motor, which acts to drive the associated drum as well as the other drums connected to it by way of pulleys wheels or gears.

While the various components of the drum assemblies can be made using any suitable materials and any manufacturing means, in some embodiments the drums, bearing shafts and/or bearing blocks can be cast injection molded or 3D printed using reinforced or unreinforced plastics. The use of plastic components in contrast to machined and forged metal components greatly reduces the cost and weight of the machine. Further, 3D printing allows replacement parts to be quickly fabricated as needed, and further permits design changes, such as modification of the teeth comprising a drum to accommodate the particularities of a certain type of stalk, to be easily implemented.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "approximately" and "substantially" as used in this specification and appended claims, refers to plus or minus 10% of the value given.

The terms "about" and "generally" as used in this specification and appended claims, refers to plus or minus 20% of the value given.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "unitary" as used herein refers to an item, component, element or other part that is made as a single piece, such as being integrally molded.

The term "T-rail" as used herein to any elongated member having one or more longitudinally extending securing slots formed into one or more sides thereof. The securing slots can have a general T-shape and/or dovetail shape configured for securing complimentary fasteners therein. "T-rail" is also referred to by those in the art as T-slotted Framing Rail. The securing slots are often referred to as T-slots, V-slots, and Dovetail Slots depending on their configuration.

A First Embodiment Decorticating Machine

A first embodiment of a decorticating machine 10 is illustrated in FIGS. 1-4. The primary components of this embodiment comprise: a plurality of longitudinal and crossmember T-rails 28 typ & 32; start and finish end plates 34; a drive shaft 40 with worm gears 42& 44 received thereon; and six drum pair assemblies 15 of which each include a pair of bearing blocks 24, four bearing races 26 typ (as used here and concerning other element numbers as well, "typ" means typical denoting more than one element of this type appears in the associated figure), a pair of drums 12-22, four axle or bearing shafts 36 typ, a drive gear 38 typ & 44, two meshing gears 48 typ. While six drum pair assemblies are shown in the illustrated embodiment, decorticators having less than six pairs and more than six pairs are also possible. In fact, the modular design of embodiments of the invention permit a decorticating machine to be specifically configured for a particular need and use with relative ease. Many different configurations of drum pairs can be specified in each machine to perform different tasks in breaking apart a particular type of plant stalk.

FIG. 5 illustrates an exploded view of a drum pair assembly 15 comprising an upper and lower drum 16 and two pairs of associated bearing shafts 36, left and right bearing blocks 24 with bearing races 26 installed, a drive gear 38 (present only on the lower drums), and two mesh gears 48. As can be appreciated, the particular types of drum pairs illustrated in FIG. 5 are merely exemplary and drum assemblies using other types of drums are similar except possibly for the particular configuration of the pair of drums.

Figure 4:
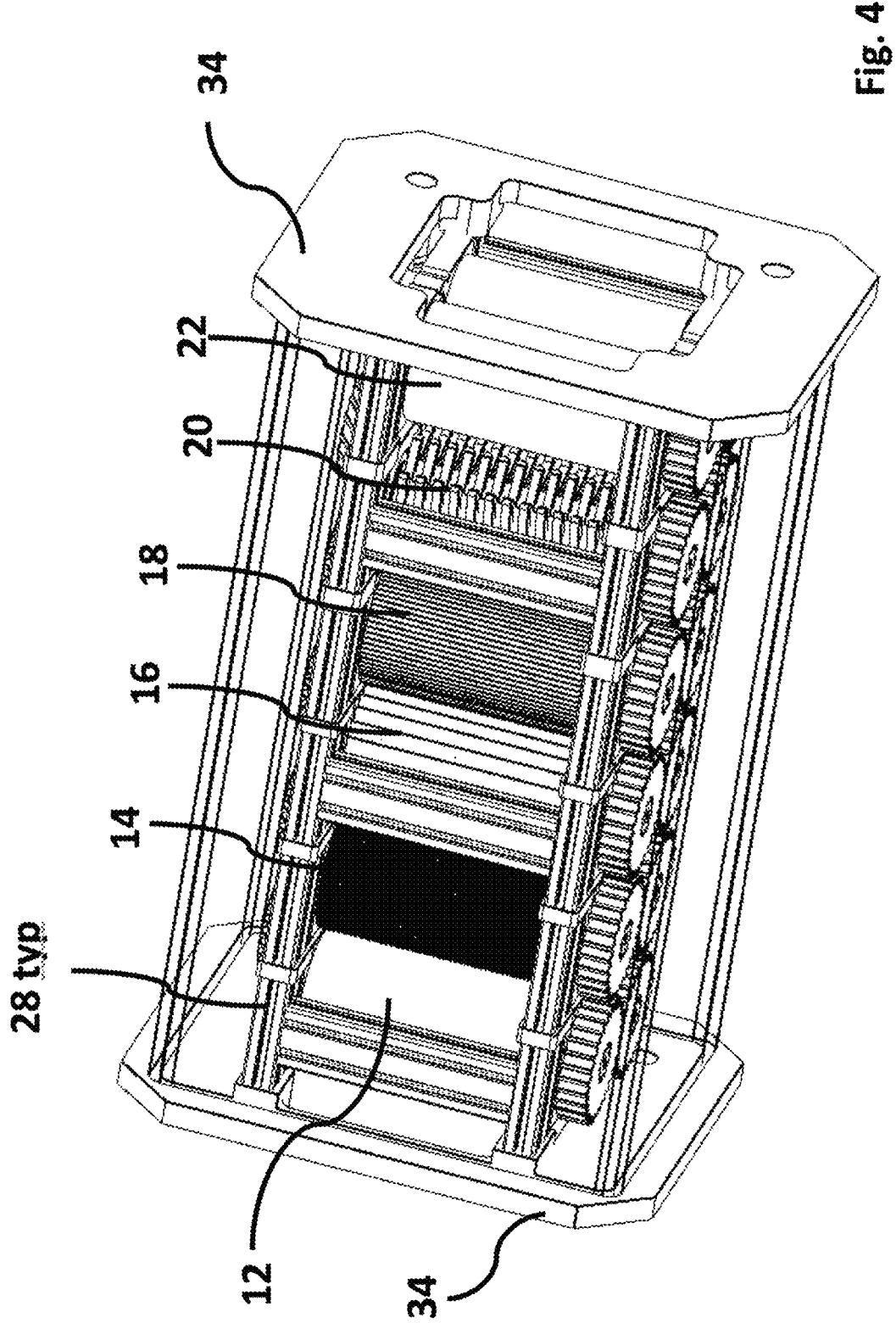
FIG. 4 is a top side perspective view of a decorticating machine according to the one embodiment of the present invention.

The various drum pair assemblies 15 are typically arranged in like pairs with an upper drum situated above a lower drum. They can be in contact with each other, have teeth that mesh a predetermined amount, or be spaced apart a predetermined amount depending on the particular configuration and function of a drum pair. Four types of drum pairs are typically employed as can be seen in FIG. 4: smooth 22&12, longitudinally ribbed teeth 16&18, circumferentially ribbed teeth 20 and combs comprising radially extending tines 14. The number, size, height and shape of the teeth and tines can all vary depending on specific function of the drum pair and its position in the decorticating machine 10.

The first and last drum pairs 12 & 22 are substantially smooth. These pairs typically act to crush stalks inserted therein as well as grab the stalks and either push them forward into the machine 10 or pull the resulting fibers from the machine.

The second drum pair 14 comprises drums with circumferentially ribbed teeth. These drum pairs act to split a stalk longitudinally into two or more pieces after it has been flattened.

The third and four drum pairs 16 & 18 comprise drums with longitudinally ribbed teeth. These drum pairs drum act to break up the hurd into smaller pieces that can be more easily removed from the fiber. As can be appreciated, the particular configuration of longitudinally toothed drums chosen in processing the stalks of a particular plant material will ultimately depend on the characteristics of the plant. The same is true for drums with circumferentially ribbed teeth. Some plants may respond best with more coarse teeth while others may respond better to drums with finer teeth. Additionally, the hurd maybe broken first into larger pieces with a course toothed drum to be followed by a finer toothed drum to break the remaining course pieces into even smaller pieces.

The fifth drum pair 20 comprises a comb. The combs act to remove any remaining hurd from the fibers that had not fallen off when passed through the drums with longitudinally extending teeth.

As shown, a pair of bearing shafts 36 are pressed into and secured in each drum along the drums longitudinal axis of rotation. These shafts extending outwardly from the ends of the drums for receipt into the bearing races 26 housed in the bearing blocks 24. The drums are typically splined as are the receiving bores in the drum and associated gears 38, 44 & 48 attached to the ends of the axles, such that any rotational force or load applied to the shafts through the gears are transferred to the associated drum. Of note, a short round bearing sleeve 62 having a splined bore and a smooth exterior surface may be received over each axle to interface with the bearing races. The sleeve 62 is illustrated in FIG. 6 with the bearing block 24.

Two basic types of gears are illustrated in the figures: drive gears 38&44; and mesh gears 48. As shown in FIG. 1, the drive gears are located on the bottom drum of a drum pair assembly and mesh with a worm gear 42&46 attached to a drive shaft 40, which is typically connected to a motor (not shown) that drives the decorticator 10. Of note, the pitch and configuration of the gears mat differ to rotate the drums at different speeds to one another. As shown, the drum pair assembly comprising the comb drums 20 turn at a slower rate than the other drum pairs and accordingly utilizes a different drive and worm gear combination 44&46.

Figure 2:
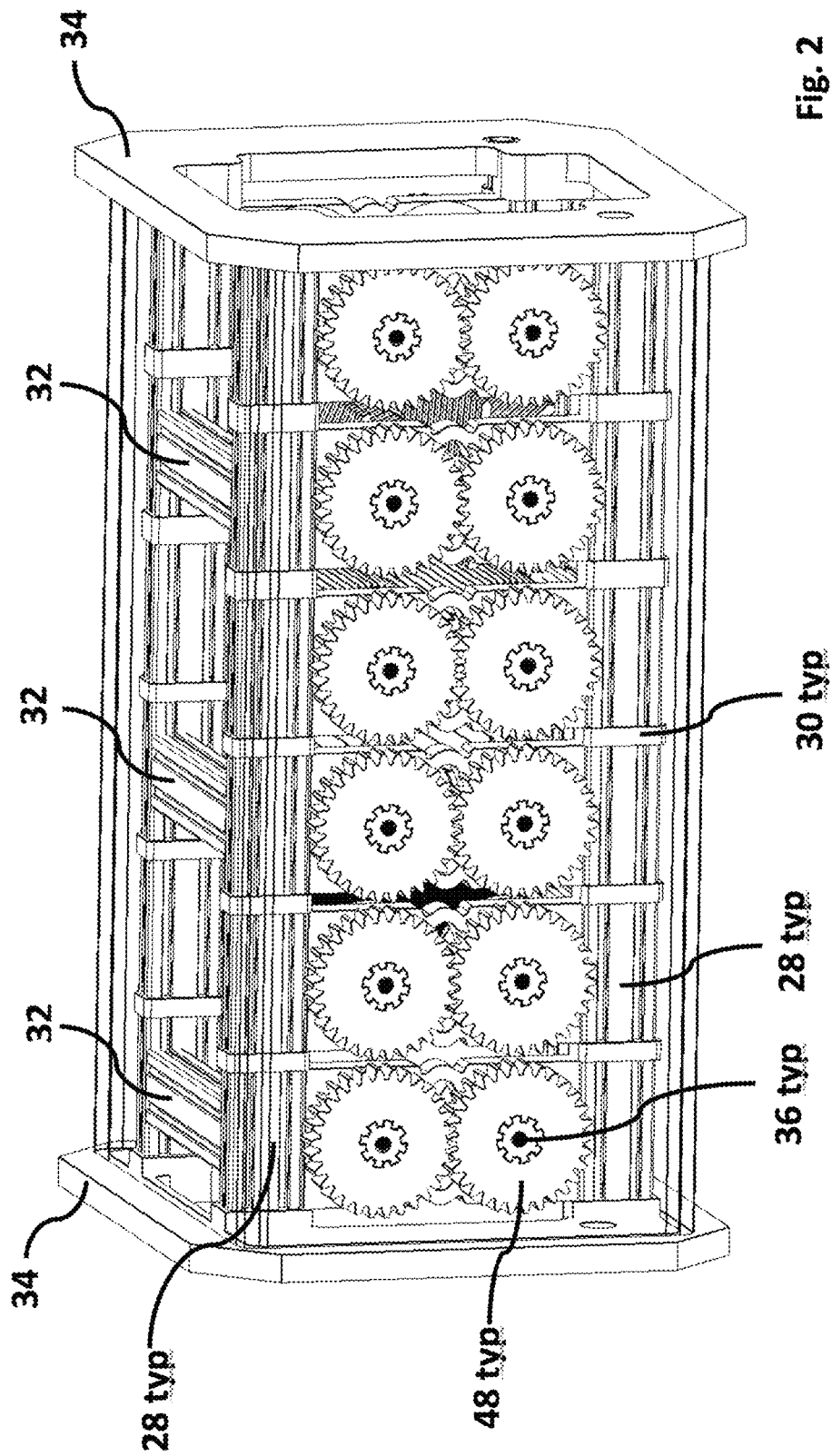
FIG. 2 is a right side perspective view of the decorticating machine according to the one embodiment of the present invention.
Figure 3:
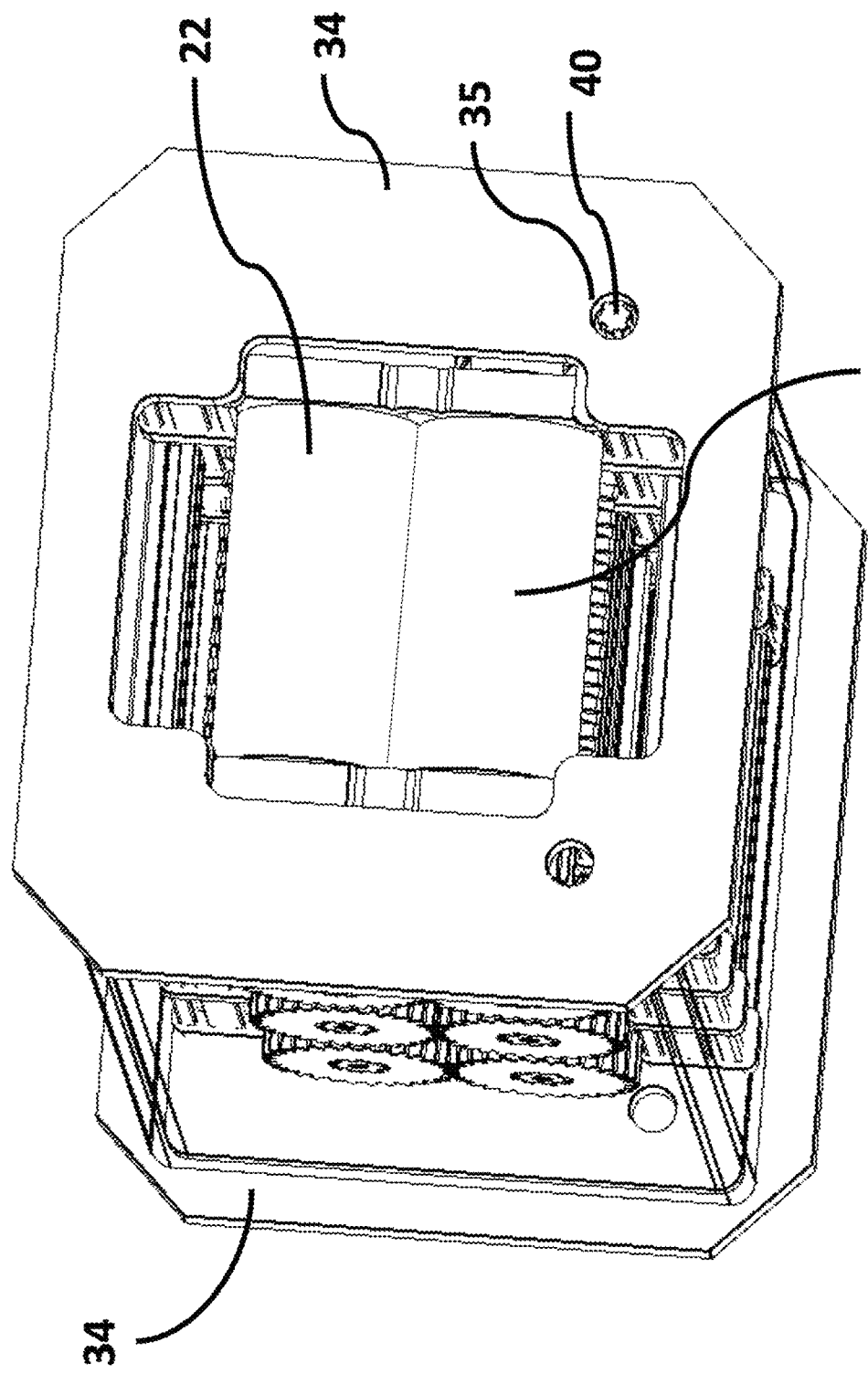
FIG. 3 is a back or end side perspective view of the decorticating machine according to the one embodiment of the present invention.

As best shown in FIG. 2, the mesh gears 48 are located on the opposite side of the drum pair assembly relative to the drive gears. The mesh gears simply provide rotational motion to the upper drum from the lower drum. In some other variations, the mesh gears may be omitted from the machine with the rotational motion of the driven drum (typically the lower drum) being transferred to the undriven drum through the interaction of the drums' surfaces with each other and the plant stalks being processed.

As mentioned the upper and lower drums are positioned relative to each other in a drum pair assembly by the bearing block 24 which is shown in FIG. 6. The bearing block comprises upper and lower section 52&54 that are interconnected by a biasing section comprised of a pair of arcuate leaves (or leaves section) 58. Each of the upper and lower sections contain a bearing bore 25 into which a bearing race 26 is fit. The bearing sleeve 62 can be received on the inside diameter of each bearing race and have a splined bore configured to receive a bearing shaft 36 therethrough. The distance between the bores and associated bearing races along with the diameter of the drums effectively set the spacing between the upper and lower drums of a drum pair assembly. For instance, the smooth drums 12 & 22 can be positioned so that the surface of the upper and lower drums touch. In the drums 16, 18 & 14 that have longitudinally or circumferentially extending teeth, the teeth of each drum may mesh with the teeth of the opposing drum such that the teeth of the one drum reside in the valley between the teeth in the other drum.

As can be appreciated, when stalks of plant material are fed between the drums, depending on the thickness of the stalks, the relative position of the touching or closely aligned drum surfaces must move vertically relative to each other. In prior art decorticators, the upper and lower equivalents to the present bearing blocks 24 were separate and distinct from each other and biased towards one another through the use of springs. The spring rate of the springs related directly to the amount of force incident on the stalks being fed through the machine's drums. In significant contrast, the bearing blocks described herein relative to some embodiments comprise a single unitary piece wherein the upper and lower sections 52&54 are joined by way of the integral arcuate leaves section 58. As stalk material is fed through the drums, the leaves flex and apply a restorative biasing force. The magnitude of the biasing force can be tailored through the material of which the bearing block and the leaves are constructed, the thickness of the leaves, and the configuration of the leaves, such as but not limited to arcuate curve of each leaf.

As indicated above, generally T-shaped protrusions are provided 56 along the top and bottom edges of the bearing blocks 24. These protrusions are configured to be slidably received in the slots of the T-rails 28 as is described in greater detail below.

The unitary bearing blocks 24, like most of the components of the decorticator, can be made of any suitable material including reinforced and unreinforced polymers, and metals. Likewise, the blocks, and other components, can be made by any suitable means including injection molding, casting and machining; however, in at least one embodiment the blocks along with many other components of the decorticator can be 3D printed.

By 3D printing many of the components of the decorticator 10 including most of the components of the drum pair assemblies 15, a user can tailor the machine relatively quickly and easily for use with stalks of a particular plant. For instance, a user may desire to split the stalks of a certain plant more finely than the circumferentially toothed drum in the machine permits. The user can then simply print a new set of drums of the desired tooth profile. Additionally, the ability to print components permits a user to quickly repair the machine when a component fails by printing a replacement part. The printed parts in a drum pair assembly can include, but are not limited to: the drum pairs 12-22; the bearing shafts 36; the drive and mesh gears 42, 44 & 48; the bearing sleeves 62; and the bearing blocks 24. The one component often not 3D printed of the drum pair assembly are the bearing races 26. Further, the worm gears 42 & 46, and the T-rail spacers 30 typ & 31 can also be 3D printed.

The drum pair assemblies 15 are installed in the frame or framework of the machine such that the drums of each pair are longitudinally parallel to each other, and the stalks proceed through the decorticator in a linear fashion. The frame is primarily comprised of upper and lower left longitudinal T-rails 28 and upper and lower right longitudinal T-rails 28. The longitudinal T-rails are mounted using suitable fasteners to start and finish end plates 34 located at either ends of the longitudinal T-rails. To further rigidify the framework crossmember T-rails 32 can span orthogonally between the longitudinal T-rails at locations intermediate to the ends.

A typical T-rail 28 is illustrated in FIG. 7. It is characterized by one or more slots longitudinally-extending slots 64 typ formed in one or more sides of the T-rail. For instance, the T-rail illustrated in FIG. 7 has a rectangular cross section with four longitudinally extending sides. The shorter sides each have one slot; whereas, the longer sides have two slots each. Typically, the slots have roughly T-shaped cross sections or dovetail-shaped cross sections that permit similarly shaped male sections to be slidably received therein while preventing the male sections from being pulled out of the slot orthogonally. For instance, the protrusions 56 on the ends of the bearing blocks 24 are slid into a corresponding slot on the T-rails to position the drum pair assemblies and hold them in place within the machine. A T-rail can be made of any suitable material but are most often extruded using an aluminum alloy. Extruded reinforced polymeric T-rails can also be utilized. As can be appreciated, the actual configuration of the T-rails and the number and configuration of the slots can also vary between embodiments.

To prevent side to side movement of the drum pair assemblies along the T-rails in which they are received and to maintain a proper distance between adjacent drum pair assemblies, spacers 30 & 31 can be provided as shown in FIGS. 8 & 9. These spacers are typically comprised of polymeric material and can be 3D printed. The actual design and configuration of the spacers as well as the width can vary as necessary and desired. The spacer shown in FIG. 8 is configured to be received over the outside of the associated T-rail and has T-shaped male protrusions that are received into the slots 64 of the T-rail 30. The spacer 31 shown in FIG. 9 is similar except it further includes a flange that extends outwardly and includes a bore with a bearing and splined insert 33 configured to receive and support the drive shaft 40.

The start and finish end plates 34 can be comprised of any suitable material whether plastic, metal, wood or a composite, and are configured to further rigidify the framework. Of note, the center of the end plates are substantially open to prove access to the adjacent drum pair whether to feed material into the machine or receive processed material out of the machine. At least one other bore 35 is typically provided through which the drive shaft 40 can pass.

A Method of Fabricating and Assembling an Embodiment of a Decorticating Machine

As indicated above, the various components of the drum pair assemblies and decorticator 10 itself can be fabricated by any suitable means, but in at least some embodiments, one or more of the bearing shafts 36, the bearing blocks 24, the drums 12-22, the spacers 30 & 31, and various gears 38, 42, 44, 46 & 48 are fabricated using a 3D printer. Any suitable polymeric materials can be used in the fabrication. In some variations, the polymeric materials are reinforced with short fiber fiberglass and/or carbon fiber.

3D printing fabrication permits an end user with the appropriate file to print his/her own replacement parts as necessary provided he/she has a suitable 3D printer thereby limiting down time in case of a failure of one or more of the machine's components. Furthermore, a user may be able to modify a particular component, such as the drum, to accommodate the particularities of the plant material being processed. Accordingly, the configuration of a resulting machine can be customized for maximum efficiency, effectiveness and utility.

Even when the end user does not have access to a printer, he/she can potentially easily order a replacement part from the manufacturer who can print it on demand even to the particular specifications of the user. In some embodiments, a user may be able to modify a CAD file to his/her particular configuration and submit it to the manufacturer over the Internet for fabrication.

Assembly of the drum pair assemblies 15 are best described with reference to FIG. 5. The bearing shafts 36 are secured in the center bore of the associated drums 12-22 typically by one or both of adhesive bonding and interference fit. The bearing blocks with bearing races 26 and bearing sleeves installed thereon are slid over the ends of the shafts. The applicable gears 38, 44 & 48 are then affixed to the ends of the shafts and secured in place typically by one or more of adhesive bonding, interference fit, and mechanical retainers.

The construction and assembly of a decorticating machine 10 can be relatively straight forward and simple. First, the number, type and even width of drum pair assemblies 15 the machine will require are determined. This dictates the length of rails 28, the number and width of the spacers 30 & 31 required, as well as, the width of the crossmember T-rails 32.

In one method of assembly, the drum pair assemblies 15, the crossmember T-rails 32 and the spacers 30 & 31 are slid onto the longitudinal T-rails 28 in the desired order. Similarly, the drive shaft 40 is slid in place through the lower bores 33 associated with the lower spacers 31. The worm gears 42 & 46 are positioned on the drive shaft as well and meshed with the associated drive gears 38 & 44. The end plates are then secured to the ends of the longitudinal T-rails to essentially complete the machine.

The finished decorticator 10 can also be mounted to a supporting framework or stand, which is typically open so that hurd and other parts of the stalk removed from the fiber during the machines operation can fall to the floor or catch bin(s) located below the machine. Before operation can commence the drive shaft 40 is coupled with a suitable drive motor.

A Method of Using a Decorticating Machine

Once the decorticator machine 10 is up and running, stalks of a fibrous plant are fed into the machine at the first drum pair assembly, which as previously described typically comprises smooth drums 12 that act to pull the stalks into the machine and crush them.

As the stalks proceed through machine, the stalks are crushed, split, and the hurd is broken into pieces. Typically, most if not substantially all of the pieces of hurd separate from the bast fibers and fall downwardly from the machine. With some types of plant material, one or more combing operations may be required to remove the final pieces of hurd. The combing operations can be integrated into the machine as shown in the Figures, or the fiber can be separately processed.

The resulting fiber can be used in any suitable manner. For instance, it can be spun into thread or yarn and subsequently used to make fabric or rope. Further, the fibers can be processed to create high strength carbon, which can be used in the fabrication of advanced composite structures.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A decorticating machine, the machine comprising:
left and right upper longitudinal T-rails;
left and right bottom longitudinal T-rails, each longitudinal T-rail of the left and right upper longitudinal T-rails and the left and right bottom longitudinal T-rails including at least a first longitudinally-extending slot;
at least a first drum pair assembly and a second drum pair assembly,
  each drum pair assembly of the first and second drum pair assemblies including,
    an upper drum and a lower drum, each drum having an circumferential surface, left and right ends and an axial bore extending longitudinally through the drum,
    one or two upper bearing shafts that are partially received in the axial bore of the upper drum and extending outwardly from each of the left and right ends of the upper drum,
    one or two lower bearing shafts that are partially received in the axial bore of the lower drum and extending outwardly from each of the left and right ends of the lower drum,
    one or more left bearing blocks and one or more right bearing blocks, each of the one or more bearing blocks of the one or more left bearing blocks and one or more right bearing blocks including at least (i) an upper bearing bore having an upper bearing shaft of the one or two upper bearing shafts received therein, (ii) a lower bearing bore having a lower bearing shaft of the one or two lower bearing shafts received therein, (iii) an upper T-shaped protrusion along a top edge, (iv) and (v) an lower T-shaped protrusion along a bottom edge;

wherein (1) the upper T-shaped protrusion of the one or more left bearing blocks of each drum pair assembly is received in the first longitudinally-extending slot of the left upper longitudinal T-rail, (2) the lower T-shaped protrusion of the one or more left bearing blocks of each drum pair assembly is received in the first longitudinally-extending slot of the left lower longitudinal T-rail, (3) the upper T-shaped protrusion of the one or more right bearing blocks of each drum pair assembly is received in the first longitudinally-extending slot of the right upper longitudinal T-rail, and (4) the lower T-shaped protrusion of the one or more right bearing blocks of each drum pair assembly is received in the first longitudinally-extending slot of the right lower longitudinal T-rail.

2. The decorticating machine of claim 1 further comprising start and finish end plates, the start end plate being attached to first ends of the left and right, upper and lower longitudinal T-rails, and the finish end plate being attached to second ends of the left and right, upper and lower longitudinal T-rails.

3. The decorticating machine of claim 1, wherein each drum pair assembly further comprises a drive gear, the drive gear being attached to an end of a bearing shaft of the one or two lower bearing shafts.

4. The decorticating machine of claim 3, further comprising a drive shaft with at least first and second worm gears received thereon, the first worm gear interfacing with the drive gear of the first drum pair assembly, and the second worm gear interfacing with the drive gear of the second drum pair assembly.

5. The decorticating machine of claim 1, wherein each drum pair assembly further comprises an upper mesh gear and a lower mesh gear, the lower mesh gear being attached to end of a bearing shaft of the one or two lower bearing shafts, the upper mesh gear being attached to end of a bearing shaft of the one or two upper bearing shafts, wherein the upper and lower mesh gears are meshed with each other.

6. The decorticating machine of claim 1, further comprising: a left upper bearing race received in the left upper bore of each drum pair assembly; a right upper bearing race received in the right upper bore of each drum pair assembly; a left lower bearing race received in the left lower bore of each drum pair assembly; and a right lower bearing race received in the right lower bore of each drum pair assembly; wherein the bearing shafts associated with the various bores pass through the associated bearing races.

7. The decorticating machine of claim 1, wherein the following are comprised primarily of a polymeric material: the upper and lower drums; the bearing shafts, and the bearing blocks.

8. The decorticating machine of claim 7, wherein the mesh and drive gears are comprised primarily of polymeric material.

9. The decorticating machine of claim 7, wherein the upper and lower drums; the bearing shafts, and the bearing blocks are 3D printed.

10. The decorticating machine of claim 1, further comprising crossmember T-rails, the cross member T-rails end between either or both the left and right upper longitudinal T-rails, and the left and right lower T-rails.

11. The decorticating machine of claim 1, wherein one or more left bearing blocks of each drum pair assembly is a left unitary bearing block and the one or more right bearing blocks are a right unitary bearing block.

12. The decorticating machine of claim 11, wherein the upper bore of each of the left and right unitary bearing block is contained in an upper section and the lower bore of each of the left and right single unitary blocks is contained in a lower section with lower section being coupled with upper section through a biasing section.

13. The decorticating machine of claim 12, wherein the biasing section comprises a pair of arcuate leaves.

14. The decorticating machine of claim 12, wherein the left and right unitary bearing blocks are each comprised primarily of polymeric materials and are 3D printed.

15. The decorticating machine of claim 12, wherein each drum pair assembly further includes a plurality of bearing races with one bearing race of the plurality of bearing races received in each of the left and right upper bearing bores, and the left and right lower bearing bores.

16. The decorticating machine of claim 11, wherein the left and right unitary bearing blocks are each comprised primarily of polymeric materials and are 3D printed.

17. The decorticating machine of claim 1, further comprising upper and lower spacers, the upper spacers being received on the left and right upper longitudinal T-rails between the first and second drum pair assemblies, and the lower spacers being received on the left and right lower longitudinal T-rails between the first and second drum pair assemblies to space the drum pair assemblies apart a predetermined distance.

18. A decorticating machine, the machine comprising:
left and right upper longitudinal T-rails;
left and right bottom longitudinal T-rails, each longitudinal T-rail of the left and right upper longitudinal T-rails and the left and right bottom longitudinal T-rails including at least a first longitudinally-extending slot;
at least a first drum pair assembly and a second drum pair assembly,
each drum pair assembly of the first and second drum pair assemblies including,
an upper drum and a lower drum, each drum having an circumferential surface, left and right ends and an axial bore extending longitudinally through the drum,
one or two upper bearing shafts that are partially received in the axial bore of the upper drum and extending outwardly from each of the left and right ends of the upper drum,
one or two lower bearing shafts that are partially received in the axial bore of the lower drum and extending outwardly from each of the left and right ends of the lower drum,
a left unitary bearing block and a right unitary bearing block, each unitary bearing block of the left and right unitary bearing blocks including (i) an upper section with an upper bearing bore having an upper bearing shaft of the one or two upper bearing shafts received therein, (ii) a lower section having a lower bearing shaft of the one or two lower bearing shafts received therein, (iii) a biasing section (iv) an upper T-shaped protrusion along a top edge of the upper section, and (iv) a lower T-shaped protrusion along a bottom edge of the lower section, wherein (1) the upper T-shaped protrusion of the one or more left bearing blocks of each drum pair assembly is received in the first longitudinally-extending slot of the left upper longitudinal T-rail, (2) the lower T-shaped protrusion of the one or more left bearing blocks of each drum pair assembly is received in the first longitudinally-extending slot of the left lower longitudinal T-rail, (3) the upper T-shaped protrusion of the one or more right bearing blocks of each drum pair assembly is received in the first longitudinally-extending slot of the right upper longitudinal T-rail, and (4) the lower T-shaped protrusion of the one or more right bearing blocks of each drum pair assembly is received in the first longitudinally-extending slot of the right lower longitudinal T-rail.

19. The decorticating machine of claim 18, wherein the biasing section comprises a pair of arcuate leaves.

20. The decorticating machine of claim 18, wherein at least the upper and lower drums, and the left and right unitary bearing blocks are 3D printed.

\* \* \* \* \*